(12) United States Patent
Ishii et al.

(10) Patent No.: US 9,063,310 B2
(45) Date of Patent: Jun. 23, 2015

(54) OPTICAL TRANSCEIVER IMPLEMENTING WITH FLEXIBLE PRINTED CIRCUIT CONNECTING OPTICAL SUBASSEMBLY TO CIRCUIT BOARD

(75) Inventors: Kuniyuki Ishii, Yokohama (JP); Hiromi Kurashima, Yokohama (JP); Michio Suzuki, Yokohama (JP); Nobuyuki Shimizu, Yokohama (JP); Yasushi Fujimura, Yokohama (JP); Noriyuki Hirakata, Osaka (JP); Toshio Takagi, Yokohama (JP); Toshiaki Kihara, Yokohama (JP)

(73) Assignees: Sumitomo Electric Industries, Ltd., Osaka-shi (JP); Sumitomo Electric Device Innovations, Inc., Yokohama-shi (JP)

( * ) Notice: Subject to any disclaimer, the term of this patent is extended or adjusted under 35 U.S.C. 154(b) by 0 days.

(21) Appl. No.: 13/976,336

(22) PCT Filed: Apr. 11, 2012

(86) PCT No.: PCT/JP2012/060393
§ 371 (c)(1),
(2), (4) Date: Jun. 26, 2013

(87) PCT Pub. No.: WO2012/141333
PCT Pub. Date: Oct. 18, 2012

(65) Prior Publication Data
US 2013/0279862 A1    Oct. 24, 2013

(30) Foreign Application Priority Data

Apr. 12, 2011  (JP) .................................. 2011-087847
May 10, 2011  (JP) .................................. 2011-105245

(51) Int. Cl.
*G02B 6/36* (2006.01)
*G02B 6/42* (2006.01)

(52) U.S. Cl.
CPC ............ *G02B 6/4281* (2013.01); *G02B 6/4246* (2013.01); *G02B 6/4263* (2013.01); *G02B 6/4269* (2013.01)

(58) Field of Classification Search
CPC .. G02B 6/4246; G02B 6/4263; G02B 6/4269; G02B 6/4281
USPC ......................... 385/88, 92; 257/678; 398/135
See application file for complete search history.

(56) References Cited

U.S. PATENT DOCUMENTS 6,976,795 B2    12/2005   Go et al.
7,030,477 B2 *   4/2006   Ishimura ....................... 257/678

(Continued)

FOREIGN PATENT DOCUMENTS

CN           101995624 A        3/2011
WO       WO-2005/054921        6/2005
WO       WO-2007/037364        4/2007

OTHER PUBLICATIONS

International Search Report in PCT International Application No. PCT/JP2012/060393, dated Jul. 19, 2012.

(Continued)

*Primary Examiner* — Peter Radkowski
(74) *Attorney, Agent, or Firm* — Venable LLP; Michael A. Sartori; Tamatane J. Aga

(57) ABSTRACT

An optical transceiver is disclosed, where the optical transceiver includes an optical subassembly (OSA) with a bottom plate for dissipating heat and connected to an electronic circuit with a flexible printed circuit (FPC). The FPC is soldered with the side electrodes of the OSA as forming a solder fillet in the plane electrode, or the FPC is soldered with the plane electrodes of the OSA as forming the solder fillet in the side electrodes, and leaving a limited room for receiving the curved FPC in peripheries of the OSA.

10 Claims, 11 Drawing Sheets

(56) References Cited

U.S. PATENT DOCUMENTS

| | | | |
|---|---|---|---|
| 7,476,040 B2 * | 1/2009 | Zack et al. | 385/93 |
| 2004/0120660 A1 * | 6/2004 | Go et al. | 385/92 |
| 2004/0146253 A1 * | 7/2004 | Wang et al. | 385/93 |
| 2006/0062526 A1 * | 3/2006 | Ikeuchi | 385/88 |
| 2007/0183719 A1 * | 8/2007 | Lee et al. | 385/47 |
| 2009/0010653 A1 * | 1/2009 | Aoki | 398/135 |
| 2009/0052898 A1 | 2/2009 | Oki et al. | |
| 2010/0322569 A1 * | 12/2010 | Ohyama et al. | 385/92 |

OTHER PUBLICATIONS

Notification of the First Office Action in Chinese Patent Application No. 201280017783.3, dated Nov. 15, 2014.

* cited by examiner

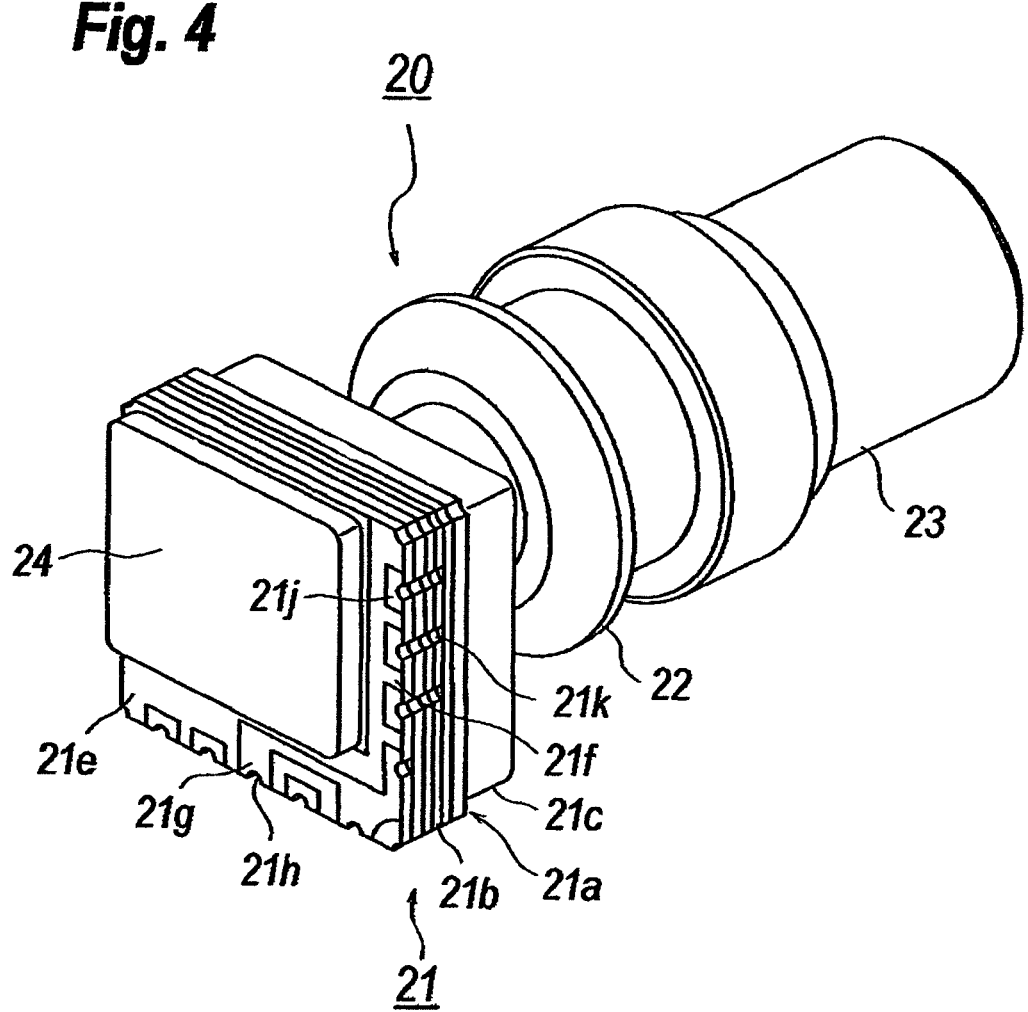

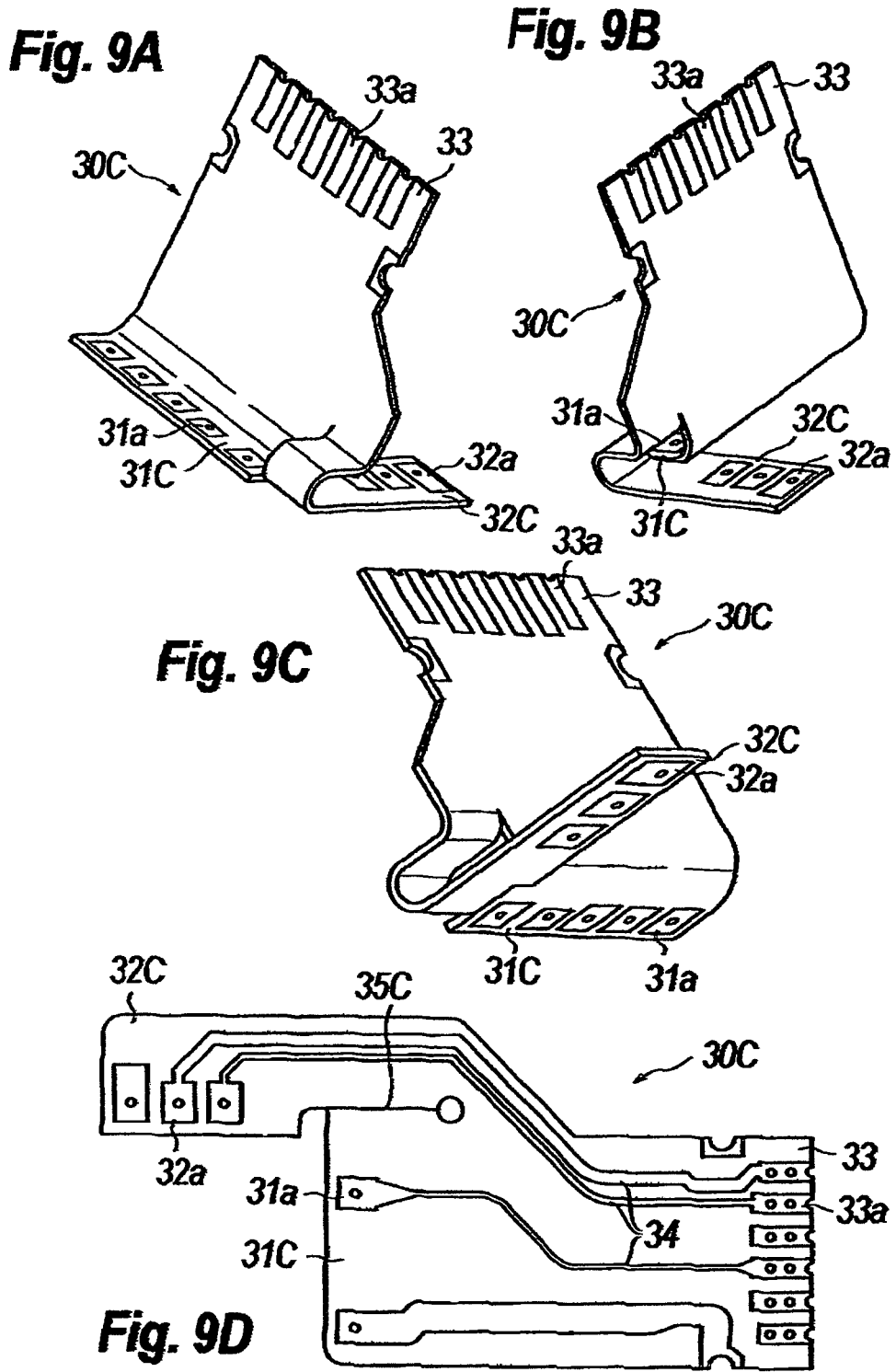

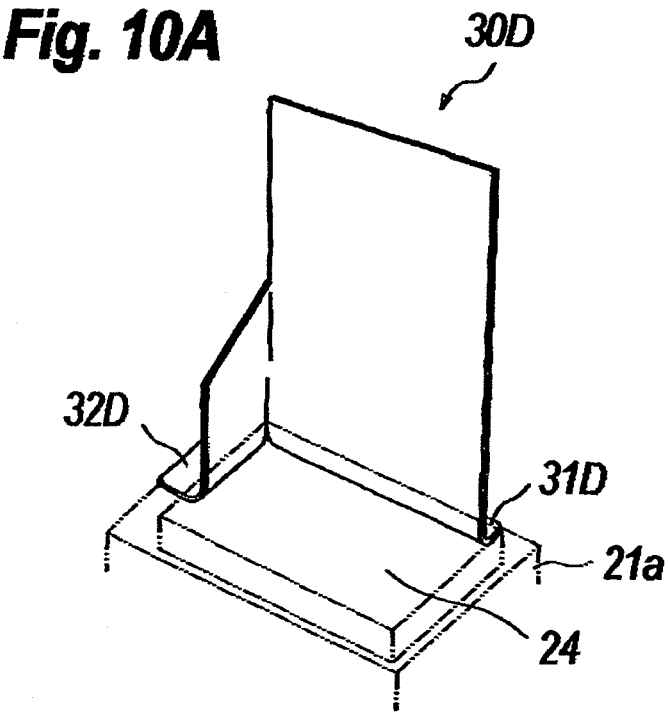
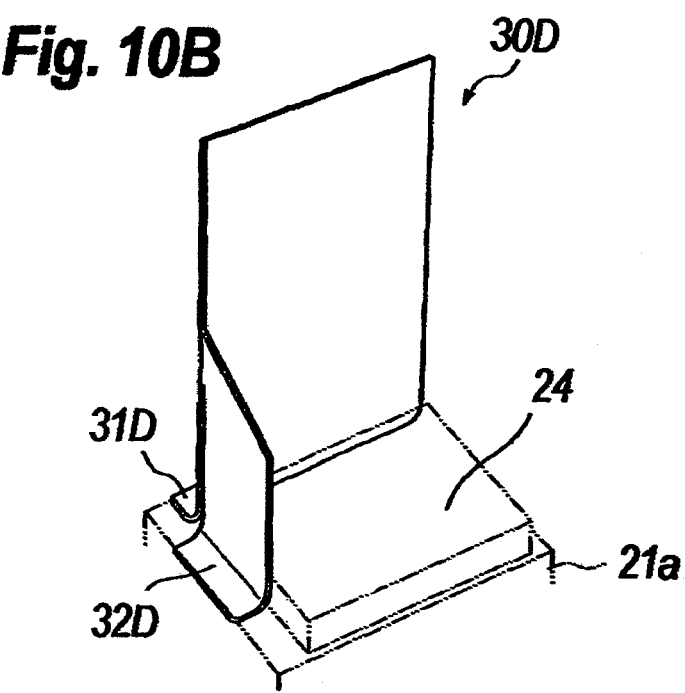

US 9,063,310 B2

OPTICAL TRANSCEIVER IMPLEMENTING WITH FLEXIBLE PRINTED CIRCUIT CONNECTING OPTICAL SUBASSEMBLY TO CIRCUIT BOARD

TECHNICAL FIELD

An embodiment of the present invention relates to an optical transceiver implementing with a flexible printed circuit connecting an optical subassembly (hereafter denoted as OSA) to an electronic circuit board.

BACKGROUND ART

An optical transceiver generally implements an OSA that performs conversion between an electrical signal and an optical signal, and an electronic circuit for processing the electrical signal. FIGS. 11A and 11B show an example of the OSA 201 that provides an optical device 202 and a coupling unit 203. The former element 202 may include a semiconductor laser diode (hereafter denoted as LD), in a case of a transmitter optical sub-assembly (TOSA), for converting the electrical signal to the optical signal. The LD is installed within a housing 202a made of multi-layered ceramics having a plurality of electrodes 202b to transmit signals therein or to provide electrical power thereto. Those electrodes 202b are connected to the circuit board via the flexible printed circuit (hereafter denoted as FPC) 210.

The FPC 210 is connected with the optical device 202 as shown in FIG. 11B. Specifically, facing the pads of the FPC against the bottom surface of the ceramic package 202a and bending the FPC at a portion 211 neighbor to the pads, those pads are soldered with the electrodes of the package 202a. Solder to fix the pads on the FPC 210 to the electrodes of the package 202a creeps up to the side portion of the package 202a, which is often called as a castellation, to from a solder fillet F. A conventional assembly of the FPC 210 and the optical device 202 may reinforce a portion of the solder fillet F by a support.

The FPC 210 is to be bent at a vicinity of the optical device 202 to be in contact with the circuit board placed behind the optical device 202. However, because of the support 220 or the solder fillet F, an excess length of the FPC 210 is necessary just beside of the package 202a of the optical device 202. This excess length sometimes becomes 1.5 mm or more, which means that the optical transceiver installing the OSA 201 is necessary to provide a room to receive the excess length of the FPC 210, and becomes hard to make the housing thereof small.

SUMMARY OF INVENTION

One aspect of the present invention relates to an optical transceiver that comprises an OSA, a circuit board and an FPC. The OSA has a bottom plate and a plurality of electrodes. Each of electrodes has a plane portion and a side portion and are arranged so as to avoid the bottom plate. The circuit board mounts an electronic circuit to communicate with the OSA. The FPC connects the OSA with the circuit board. The FPC has first to third areas. The first and second areas are connected to the OSA, while, the third area is connected to the circuit board. A feature of an embodiment according to the invention is that the FPC is soldered to one of the side portion and the plane portion of the electrodes in the OSA as leaving a solder fillet on the other of the side portion and the plane portion.

BRIEF DESCRIPTION OF DRAWINGS

The invention may be more completely understood in consideration of the following detailed description of various embodiments of the invention in connection with the accompanying drawings, in which:

FIG. 4 is a rear view of the TOSA shown in FIG. 3 to show an arrangement of the electrodes provided in the bottom and the side of the package;

FIGS. 9A to 9C are perspective views of the FPC assembled with the TOSA shown in FIGS. 8A and 8B, while, FIG. 9D is a plan view of the FPC assembled with the TOSA;

FIGS. 10A and 10B are perspective views of still another arrangement to assemble the FPC with the TOSA according to the fourth embodiment of the invention.

DESCRIPTION OF EMBODIMENTS

Figure 1:
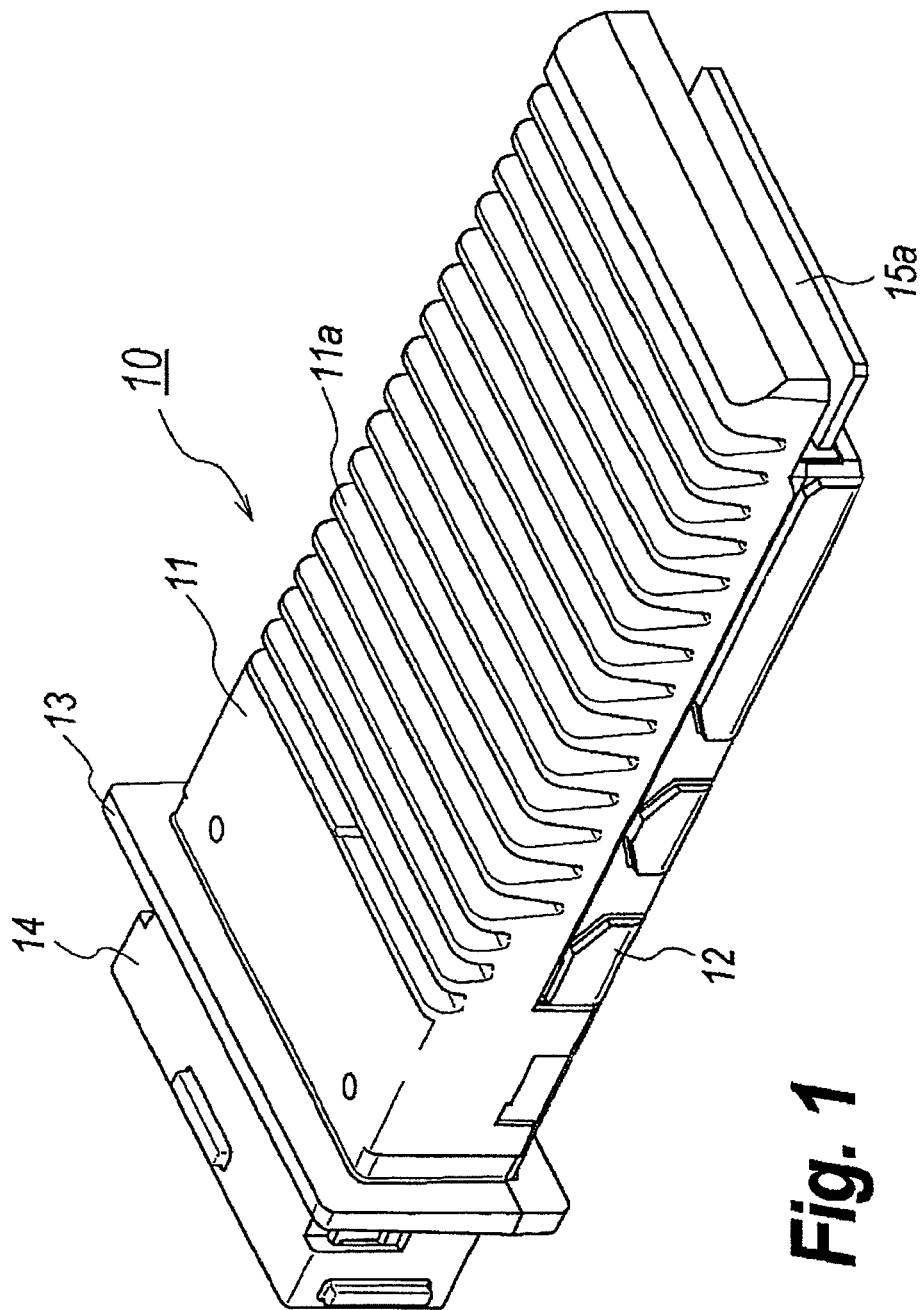
FIG. 1 is an outer shape of an optical transceiver according to an embodiment of the present invention.

Next, some embodiments according to the present invention will be described as referring to drawings. An optical module according to an embodiment of the invention may be applicable to, for instance, an optical transceiver illustrated in FIGS. 1 and 2. The optical transceiver 10 shown in the figures comprises an optical sub-assemblies (OSA) that installs an optical device that performs conversion between an optical signal and an electrical signal, for instance, a semiconductor laser diode (LD) for a transmitter optical subassembly (TOSA) or a semiconductor photodiode (PD) for a receiver optical subassembly; and an electronic circuit electrically communicating with the OSAs and mounted on a circuit board. These elements, the OSAs and the circuit board, are enclosed within a housing comprised of a top cover 11 and a bottom cover 12. The optical subassembly according to the present embodiment provides a ceramic package to enclose the LD or the PD therein.

The housing, specifically, the top cover 11 and the bottom cover 12, may be made of metal to have functions of not only electrically shielding the circuit enclosed therein but effectively dissipating heat generated by the electronic circuit outside the housing. The housing, 11 and 12, may provide an optical receptacle 14 to receive an external optical connector therein. The optical receptacle 14 provides, in the rear end thereof, a flange 13 to set the optical transceiver 10 in a host system. The rear end of the housing, 11 and 12, exposes an end of the circuit board, where an electrical plug 15a is formed, to communicate electrically with the host system. Specifically, inserting the electrical plug 15a into an electrical connector provided in the host system, an electrically communicating path for the host system may be secured. In the explanation above and presented below, contexts such as "front", "rear", "top", "bottom", and so on are used only for the explanation sake; and not always reflect the practical conditions.

Figure 2:
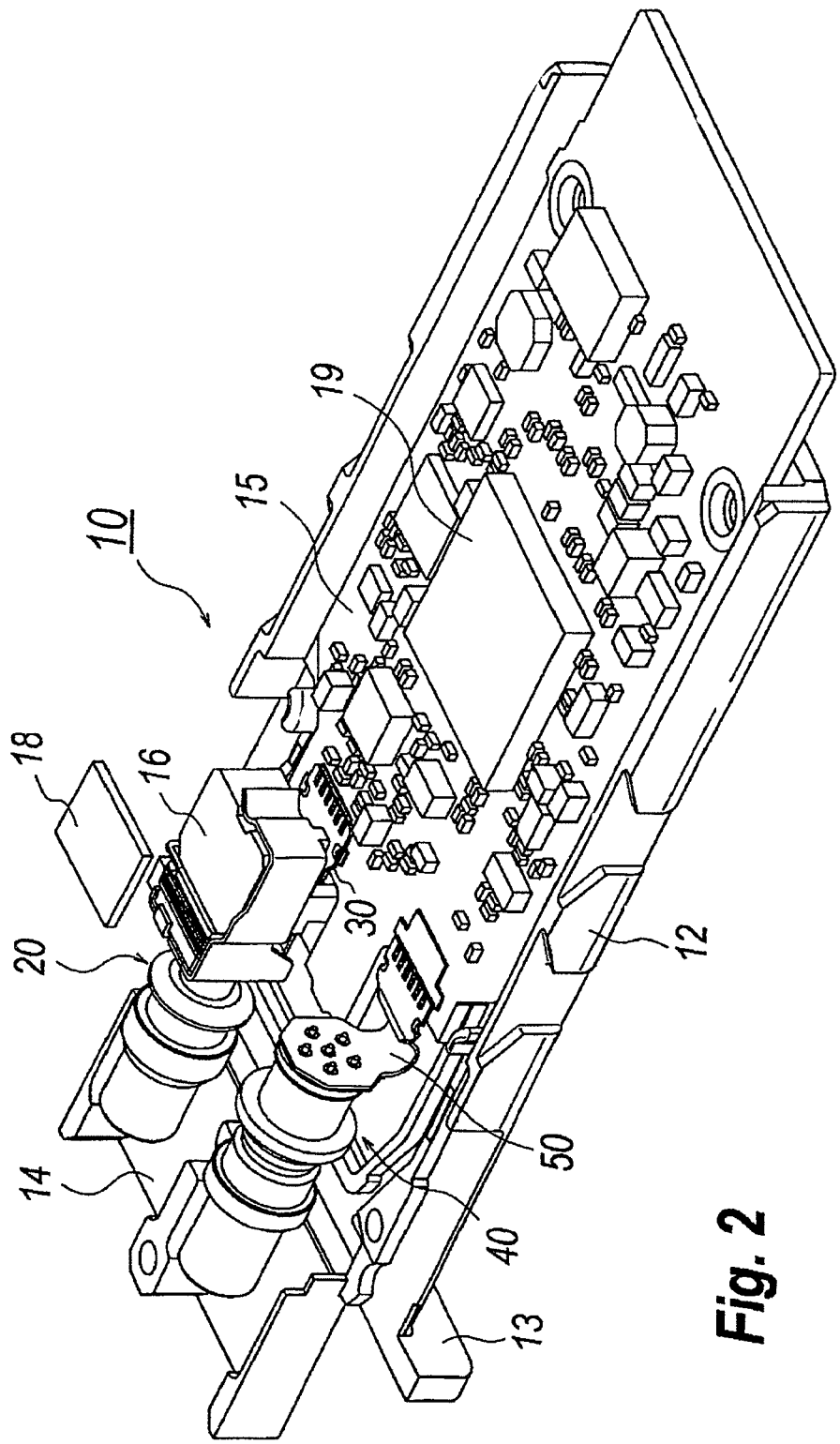
FIG. 2 shows an inside of the optical transceiver shown in FIG. 1, which omits an upper housing to show the inside thereof.

FIG. 2 exposes the inside of the optical transceiver 10 by omitting the top cover 11. The bottom cover 12 mounts the circuit board 15, and the circuit board 15 mounts circuits communicating with OSAs, 20 and 40, and including active devices 19 such as an LD-driver, an amplifier and so on, and some passive devices. The bottom cover 12 also mounts the receiver optical subassembly (ROSA) 40 and the transmitter optical subassembly (TOSA) 20 in a front thereof, which are electrically connected with the circuit board 15 via the flexible printed circuit (FPC) board, 30 and 50, respectively. Heat generated by the TOSA 20 may be conducted to the top cover 11 via a thermal block 16.

Figure 3:
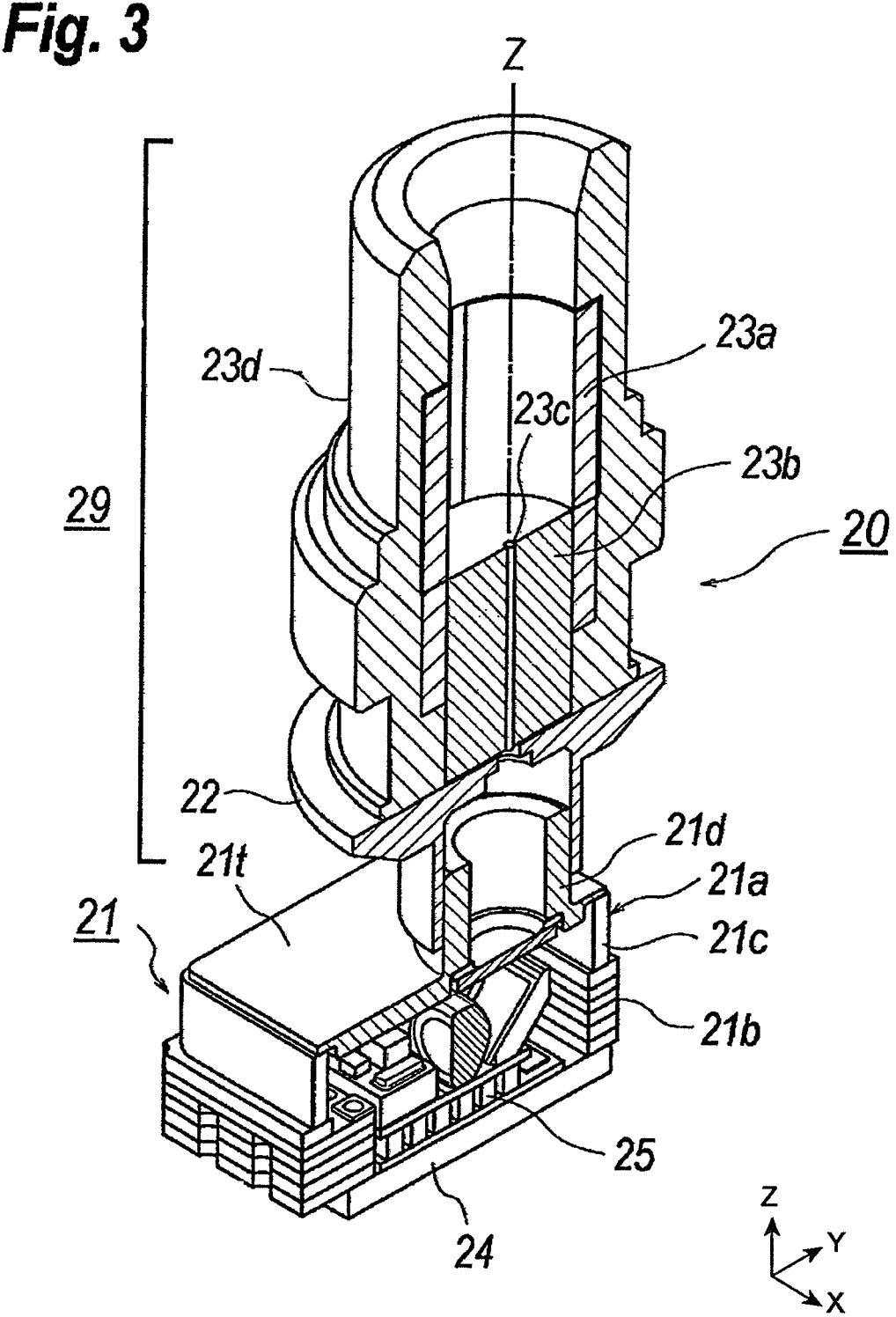
FIG. 3 is a partially cut view of a TOSA installed in the optical transceiver shown in FIGS. 1 and 2.

FIGS. 3 and 4 illustrate the TOSA 20 according to an embodiment of the invention. FIG. 3 is a partially cut view, while, FIG. 4 is a rear view of the TOSA 20. The TOSA 20 of the embodiment as shown in FIG. 3, includes a transmitter device 21 enclosing a semiconductor light-emitting device and a coupling unit 29 to couple the semiconductor light-emitting device with an optical fiber. The transmitter device 21 provides a ceramic package 21a whose side walls are formed by stacking a plurality of rectangular ceramic films, a top wall 21c and a ceiling 21t with a cylindrical chimney 21d. The coupling unit 29 includes a joint sleeve 22, a sleeve 23a, a stub 23b with a coupling fiber 23c in a center thereof and a sleeve cover 23d. These elements, 23a to 23d, constitute a sleeve member assembled with the cylindrical chimney 21d of the transmitter device 21 via the joint sleeve (J-sleeve) 22.

The ceramic package 21a provides a bottom plate 24 on which a thermo-electric-cooler (TEC) 25 is mounted. The TEC may cool down or heat up a top plate thereof, concurrently, the bottom plate thereof is heated up or cooled down to keep the thermal equilibrium between two plates. The LD as the semiconductor light-emitting device may be mounted on the top plate of the TEC 25 to control a temperature thereof. The LD generates heat driven by a current, which increases the temperature of the LD and shifts a wavelength of light emitted from the LD. Accordingly, it is generally necessary to keep the operating temperature of the LD in constant, or usually to cool down the temperature thereof, by mounting the LD on the TEC 25.

In order to cool down the bottom plate of the TEC 25, which is usually heated up by cooling the top plate thereof down, the bottom plate of the TEC is necessary to conduct heat efficiently to a substance outside of the package 21a. That is, the bottom plate 24 of the ceramic package 21a is inevitably to be physically in contact in a whole surface thereof with an external substance. Then, the FPC 30 connected to the transmitter device 21 is required to escape from the bottom plate 24 of the ceramic package 21a.

As described, the I-sleeve 22 may optically couple the transmitter device 21 with the optical fiber to be set within the sleeve 23a, which is not shown in the figures. Adjusting an insertion depth of the I-sleeve 22 into the cylindrical chimney 21d, the optical alignment along the optical axis, Z-direction, may be carried out; while, sliding the sleeve cover 23d on the ceiling of the I-sleeve 22, the alignment in the plane perpendicular to the optical axis, XY-direction, may be performed.

The coupling unit 29 may receive an external optical fiber, which is not explicitly illustrated in the figures. The coupling unit 29 includes the sleeve 23a, the stub 23b and the sleeve cover 23d, where these elements have a cylindrical shape. The stub 23b has the coupling fiber 23c in a center thereof. Inserting the external fiber, in particular, a cylindrical ferrule securing the external fiber in a tip thereof, into the sleeve 23a and making the tip of the external fiber abut against the tip of the coupling fiber 23c, the physical contact between the external fiber and the coupling fiber 23c may be realized without causing the substantial reflection thereat. On the other hand, the light emitted from the LD is focused on the other end of the coupling fiber 23c by the lens in the transmitter device 21. Thus, the light generated by the LD in the transmitter device 21 may enter the external fiber set in the sleeve 23a.

The bottom plate 24 of the ceramic package 21a and the FPC 30 attached to the OSA will be described. As shown in FIG. 4, the bottom plate 24 of the ceramic package 21a having a substantial thickness is stuck out from the multi-layered ceramics 21b. Moreover, the bottom plate 24 forms rooms along two edges neighbor to each other to form electrodes thereat. That is, the first room 21e of the package 21a includes a plurality of electrodes each having a plane portion 21g and a side portion 21h extending from the plane portion 21g along the side wall of the multi-layered ceramics 21b. The second room 21f also provides the electrodes each having the plane portion 21j and the side portion 21k extending in the side surface of the ceramic layers 21b. The side electrodes, 21h and 21k, have a semi circular cross section, which is often called as the castellation. The FPC 30 is connected to those pads, 21g to 21k.

Figure 5A:
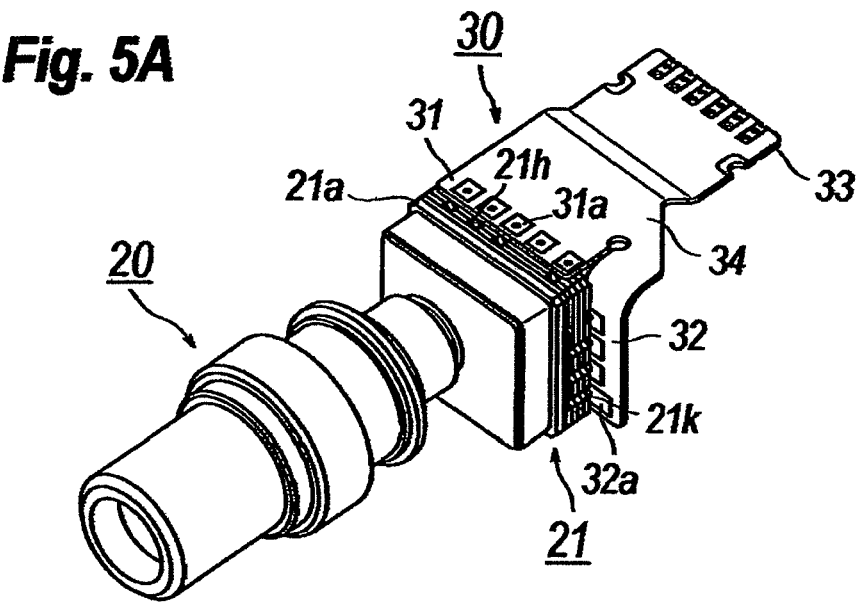
FIGS. 5A and 5B show a TOSA shown in FIG. 4 attached with an FPC.
Figure 5B:
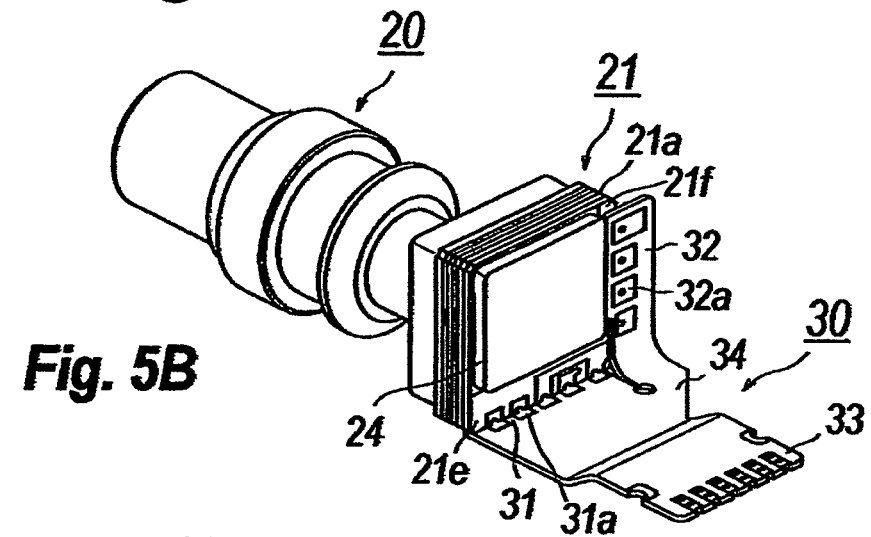
Figure 5C:
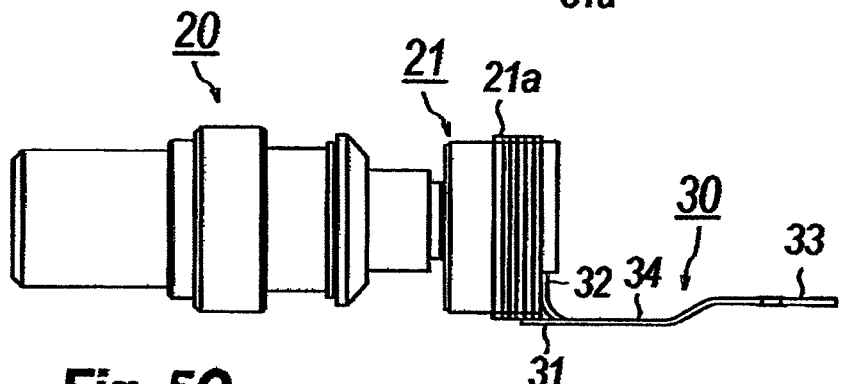
FIG. 5C is a side view of the TOSA.
Figure 6:
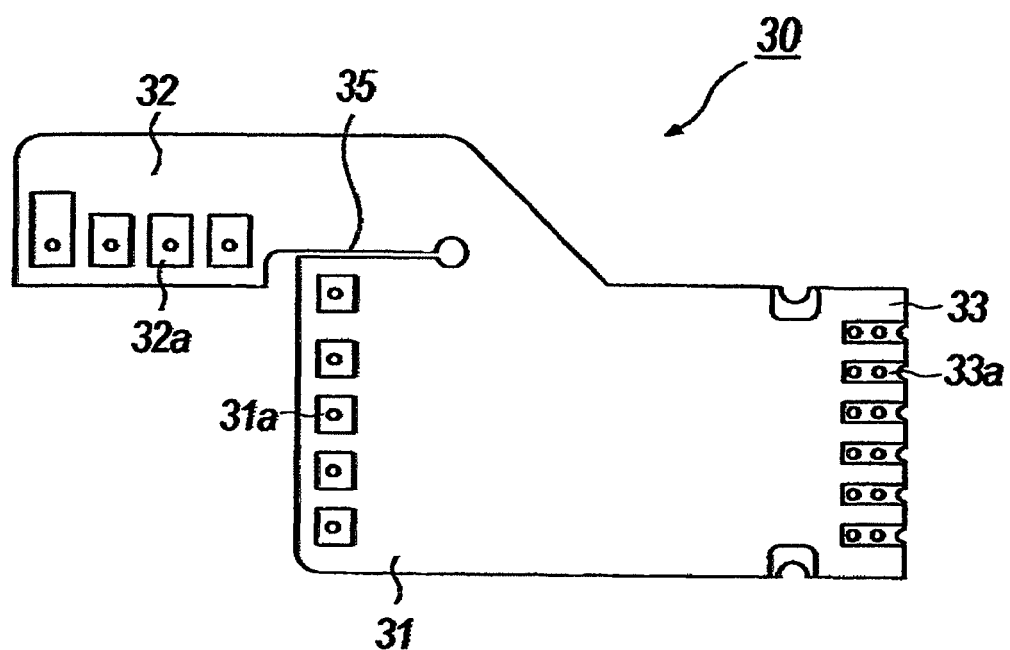
FIG. 6 is a plan view of the FPC to be assembled with the OSA as shown in FIGS. 5A and 5B.

FIGS. 5A to 5C schematically illustrate the TOSA 20 assembled with the FPC 30; while, FIG. 6 is a plan view of the FPC 30. The FPC 30, as shown in FIG. 6, provides the first area 31 for radio frequency (RF) pads 31a, the second area 32 for low frequency (LF) pads 32a, and the third area 33 for board pads 33a. The RF pads 31a in the first area 31 are arranged in a line; while, the LF pads 32a in the second area 32 are also arranged in a line substantially perpendicular to the line of the RF pads 31a. The RF pads 31a in the first area 31 are connected with the board pads 33a in the third area in the shortest, while, the LF pads 32a in the second area is detoured, or offset from the line connecting the RF pads 31a with the board pads 33a.

These two lines of the arrays surround the bottom plate 24 of the package 21a; specifically, two lines are running in parallel to respective edges of the bottom plate 24. Moreover, the FPC 30 provides a slit 35 between the first and second areas, 31 and 32, which facilitates the FPC 30, in particular, the second area 32 thereof, to be bent from the first and third areas, 31 and 33. When the FPC 30 has no slit between the first and second areas, 31 and 32, a radius to bend the second area 32 is forced to be small, which may cause a breaking of wiring 34 on the FPC 30. The slit 35 provided between two areas, 31 and 32, enables the bent radius of the FPC 30 to be large to enhance the reliability of the wiring.

Referring to FIGS. 5A to 5C again, the RF pads 31a in the first area 31 of the FPC 30 are connected to the side portion 21h of the electrodes in the first room 21e as leaving a solder fillet on the plane portion 21g of the electrode without being bent at the first area 31; while, the LF pads 32a in the second area 32 are connected to the plane portion 21j of the electrodes in the second room 21f as leaving the solder fillet in the side portion 21k after being bent at a root portion of the second area 32 by about a right angle. Because the RF pads 31a are connected with the side portion 21h without any bending the first area 31, the wiring 34 formed therein, which transmits high frequency signals, may be protected from the breakage.

Moreover, the RF pads 31a not only covers the side portion 21h of the electrodes in the first room 21e but directly comes in contact thereto without bending the first area 31 of the FPC 30, as shown in FIG. 5C. Thus, an excess space to receive a bent FPC becomes unnecessary in an arrangement of the FPC 30 according to the embodiment of the invention. The arrangement of the embodiment may further escape the FPC 30 from coining in contact with the bottom housing 12 in a bent portion thereof which not only makes the housing compact but reduces the degradation of the signals with high frequency components propagating on the wiring 34 in the FPC 30 because the wiring 34 is not in contact with the bottom housing 12.

The FPC 30 without being bent in the first area 31 thereof may shorten the wiring running thereat, which may also suppress the degradation of the high frequency signals propagating thereon and enhance the reliability. Although the second area 32 of the FPC 30 is bent to connect to the plane portion 21j in the second room 21f these electrodes 21j are connected to the LF pads 32a that carries signals with relatively lower frequencies; accordingly, the length of the second area 32 and the presence of bent portions does not affect the quality of the signals.

Second Embodiment

Figure 7A:
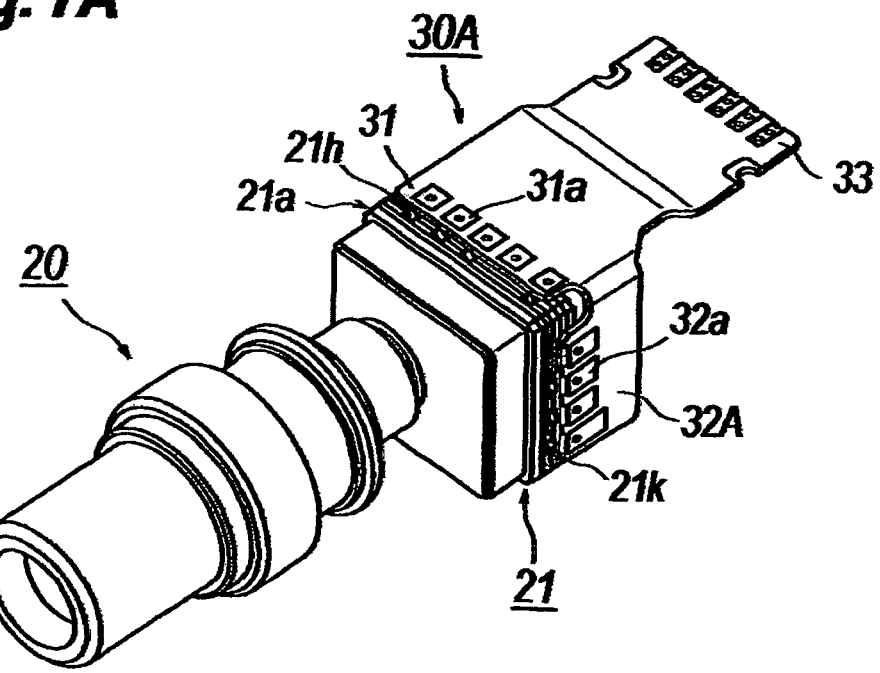
FIGS. 7A and 7B are perspective views of a TOSA according to another embodiment of the invention, the TOSA having a modified arrangement of the FPC attached thereto.
Figure 7B:
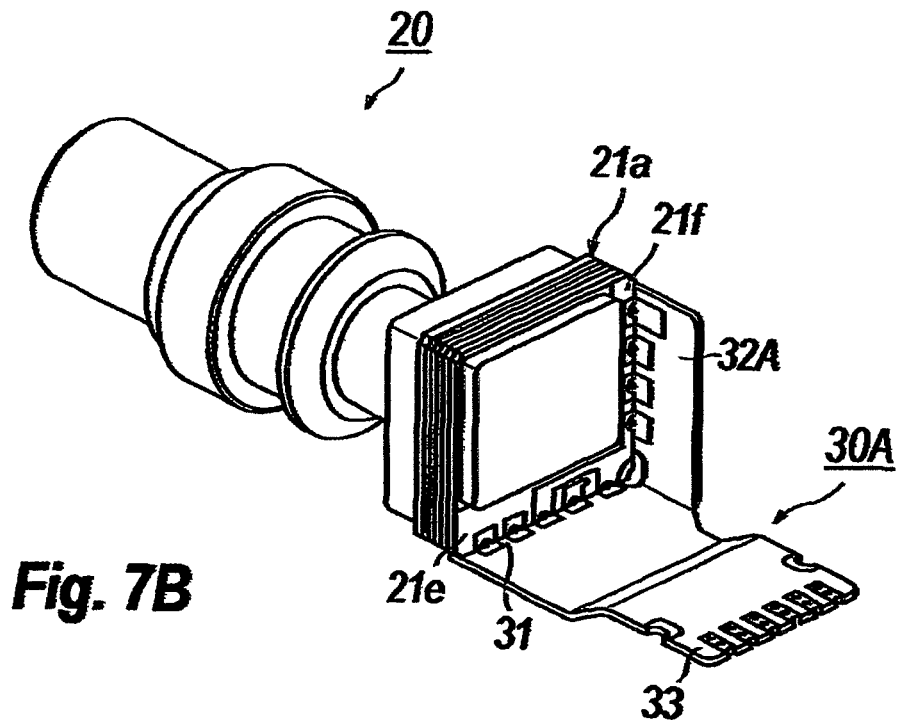

FIGS. 7A and 7B illustrates another arrangement of the FPC 30A assembled with the transmitter device 21. The FPC 30A of the embodiment has another second area 32A extending from the first area 31 but, in contrast to the arrangement of the aforementioned FPC 30, in a direction perpendicular to a direction connecting the first area 31 and the third area 33. That is, the second area 32A of the embodiment laterally extends with respect to the first area 31, and is bent at a root portion thereof. The LF pads 32a of the second area 32A are soldered not only to the plane side portion 21k but to leave the solder fillet on the plane portion 21j in the second room 21f. Thus, the arrangement of the FPC 30A shown in FIGS. 7A and 7B, may save a space for receiving a bent FPC outside of the second area 32A of the FPC 30A, which may make the housing of the optical transceiver 10 further compact along the lateral direction.

Third Embodiment

Figure 8A:
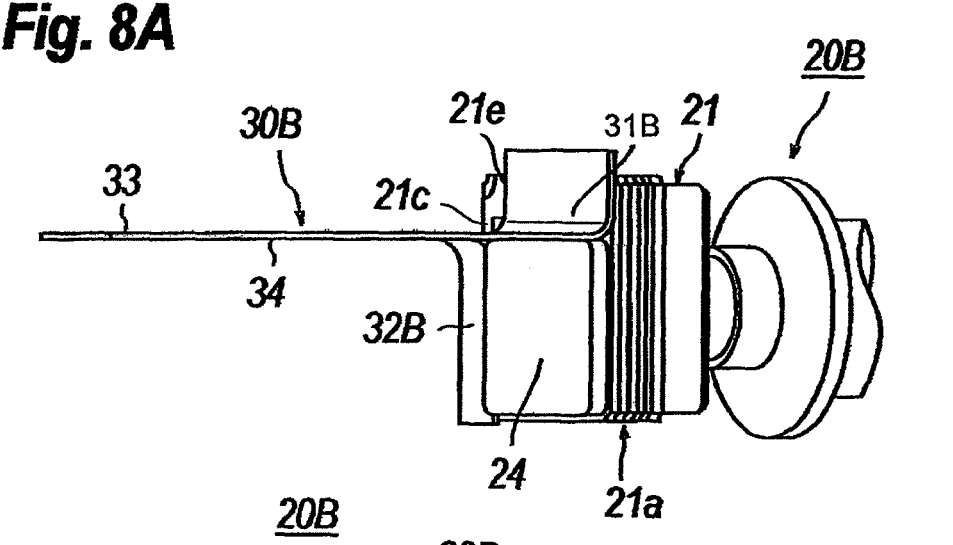
FIGS. 8A and 8B are perspective views of a TOSA according to still another embodiment of the invention, where the TOSA assembles an FPC with another arrangement to be fixed to the TOSA.
Figure 8B:
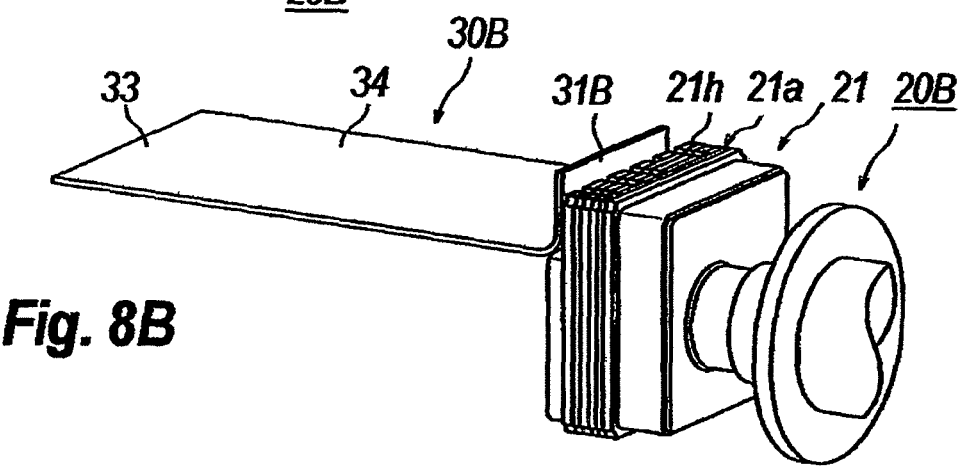
Figure 8C:
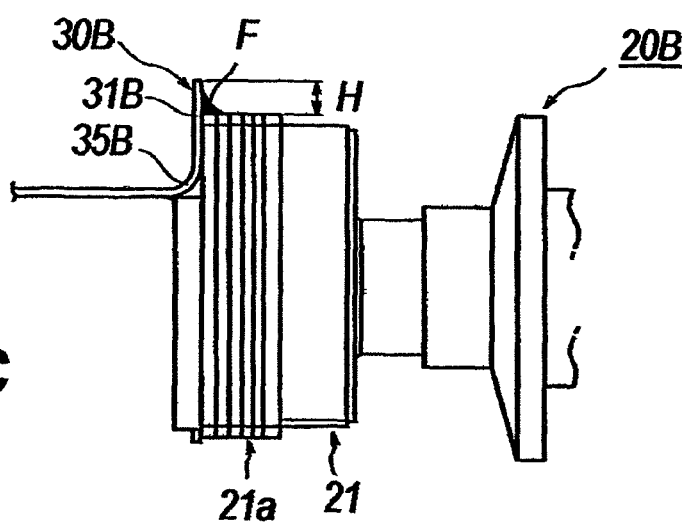
FIG. 8C is a side view of the TOSA shown in FIGS. 8A and 8B.
Figure 11A:
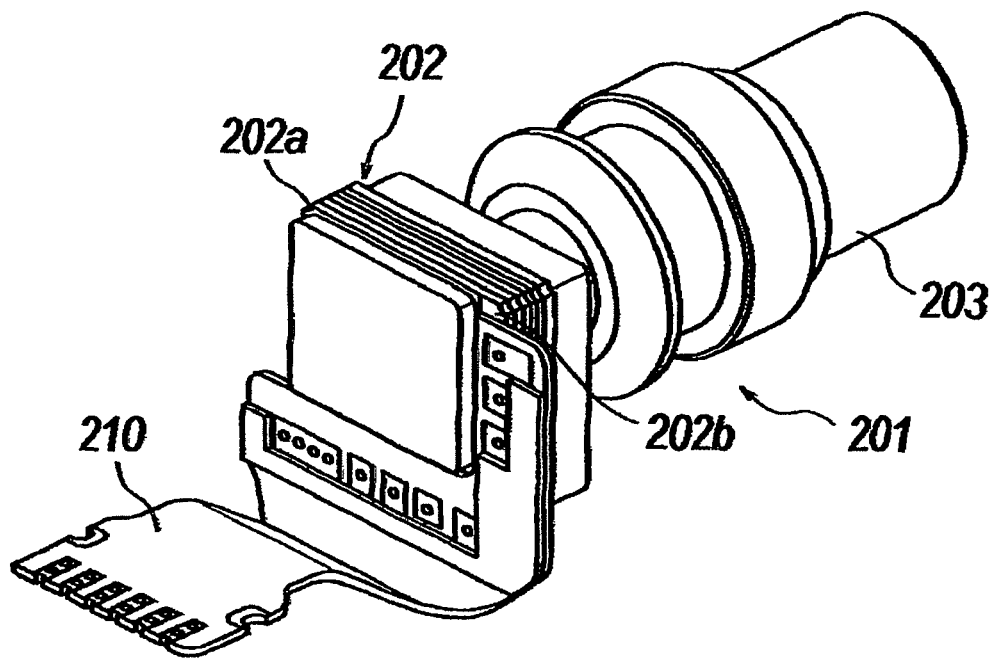
FIG. 11A is a perspective view of a conventional arrangement of the FPC assembled with the TOSA.
Figure 11B:
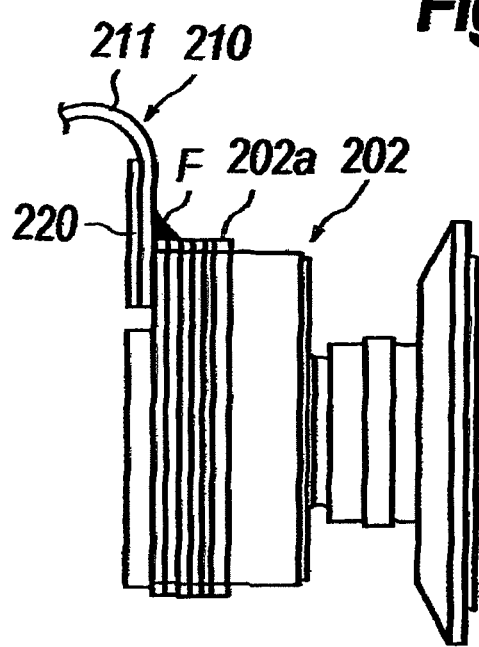
FIG. 11B is a side view of the arrangement shown in FIG. 11A.

FIGS. 8A to 8C illustrate an assembly of a transmitter optical device 20B according to the third embodiment of the invention, where FIGS. 8A and 8B are perspective views of the assembly; while, FIG. 8C is a side view. The FPC 30B of the present embodiment also provides, similar to those of aforementioned embodiments, the first area 31B and the second area 32B, the former of which is connected to the electrodes in the first room 21e, while, the latter area 32B is connected to the electrodes in the second room 21f. The FPC 30B further provides the third area 33 substantially identical with the third area of the former embodiments. Wires 34 are also formed on the FPC 30B.

As shown in the figures, the FPC 30B is connected with the plane portion 21g in the first room 21e such that it is extended along the edge of the bottom plate 24, namely in parallel to the normal of the bottom plate 24, bent at the deep corner between the bottom plate 24 and the first room 24e, and extended outwardly. The pads 31a in the first area 31B are soldered not only with the plane portion 21g but leave the solder fillet F on the side portion 21h.

The second area 32B of the FPC 30B is bent along the other edge of the bottom plate 24, and extends toward a direction opposite to the first area 31B to cover the plane portion 21j of the electrodes in the second room 21f. An edge of the second area 32B slightly sticks outwardly to form other solder fillets in the side portion 21k.

In the arrangement of the FPC 30B according to the embodiment, although the FPC 30B is bent to be in contact with the plane portion, 21g and 21j, of the electrodes; the side extension H stuck out from the edge of the package 21a may be less than about 1.0 mm, because the FPC 30B is bent at a portion within the periphery of the package 21a. Moreover, the FPC 30B extends in substantially linear after the bend above described to be in contact with the circuit board 15. Thus, the arrangement of the FPC 30B and the transmitter device 21 according to the embodiment is unnecessary to provide a room in a side of the package 21a to receive a bent FPC.

FIGS. 9A to 9D show the FPC 30C modified from the FPC 30B shown in FIG. 8, where FIGS. 9A to 9C are perspective views by omitting wirings 34 on the FPC, while FIG. 9D is a developed view thereof. The FPC 30C of the present embodiment shown in FIGS. 9A to 9C, provides the first pads 31a in the first area 31C, the second pads in the second area 32C, and third pads 33a in the third area 33. The FPC 30C also provides a slit 35C between the first and second areas, 31C and 32C.

The slit 35C between the first and second areas, 31C and 32C, may facilitate the bend of the areas. The FPC 30C could not be connected in the plane portion, 21g and 21j, at the same time. Bending the first area 31C outwardly in an FPC with no slit, the second area 32C is inevitably bent outwardly to make the pads 32a in the second area 32C separate from the plane portion 21j of the electrode in the second room 21f. The slit 35C makes it possible for the first area 31C and the second area 32C to be bent oppositely.

FIGS. 10A and 10B show still another embodiment of the FPC according to the present invention. The FPC 30D has a feature that the second area 32D thereof has substantially same bending arrangement as that of the first area 31D. That is, the second area 32D is once bent at a side of the first area 31D, then bent outwardly along the edge of the bottom plate 24 to form the shape same as those of the first area 31D. The end of the second area 32D also slicks out from the edge of the package 21a, which enables to form the solder fillet to be in contact with the side portion 21k of the electrode, namely the castellation.

In the foregoing detailed description, the method and apparatus of the present invention have been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive.

The invention claimed is:
1. An optical transceiver, comprising:
an optical subassembly (OSA) having a bottom plate and a plurality of electrodes each including a plane portion and a side portion, the electrodes being arranged to avoid the bottom plate;
a circuit board for mounting an electronic circuit communicating with the optical subassembly; and
a flexible printed circuit (FPC) for connecting the optical subassembly to the circuit board, the flexible printed circuit having a first area and a second area connected to the OSA, and a third area connected to the circuit board, the first area of the FPC being soldered to the side portion of the electrodes of the OSA as leaving a solder fillet in the plane portion of the electrodes, the second area being divided from a portion connecting the first area to the third area.

2. The optical transceiver of claim 1,
wherein the OSA has a rectangular housing with the bottom plate attached to the rectangular housing to form a first room and second room on the bottom plate, the first and second rooms extending along two respective sides of the bottom plate neighbor to each other and providing the electrodes,
wherein the first area of the FPC is soldered to the side portion of the electrodes in the first room of the OSA as leaving the solder fillet in the plane portion of the electrodes in the first room.

3. The optical transceiver of claim 2, wherein the second area of the FPC is attached to the side portion of the electrodes in the second room as leaving the solder fillet in the plane portion of the electrodes in the second room.

4. The optical transceiver of claim 1,
wherein the FPC has a slit between the first area and the second area.

5. The optical transceiver of claim 1,
wherein the first area of the FPC faces the third area of the FPC to connect the first area and the third area with each other in substantially shortest, and
wherein the second area of the FPC is offset from a line connecting the first area to the third area.

6. The optical transceiver of claim 5,
wherein the FPC extends from the first area thereof attached to the OSA to the third area thereof attached to the circuit board substantially in flat.

7. The optical transceiver of claim 1,
wherein the first area provides a plurality of pads for signals with high frequency components, and the second area provides a plurality of pads for signals with low frequency components.

8. The optical transceiver of claim 7,
wherein the bottom plate mounts a thermoelectric controller.

9. The optical transceiver of claim 2,
wherein the second area of the FPC is attached to the plane portion of the electrodes in the second room as leaving the solder fillet in the side portion of the electrodes in the second room.

10. An optical transceiver, comprising:
an optical subassembly (OSA) having a bottom plate and a plurality of electrodes each including a plane portion and a side portion, the electrodes being arranged to avoid the bottom plate;
a circuit board for mounting an electronic circuit communicating with the optical subassembly; and
a flexible printed circuit (FPC) for connecting the optical subassembly to the circuit board, the flexible printed circuit having a first area and a second area connected to the OSA, and a third area connected to the circuit board, the FPC being soldered to one of the side portion and the plane portion of the electrodes of the OSA as leaving a solder fillet in the other of the side portion and the plane portion of the electrodes,
wherein the first area provides a plurality of pads for signals with high frequency components, and the second area provides a plurality of pads for signals with low frequency components.

\* \* \* \* \*